United States Patent [19]

Sakuragi et al.

[11] Patent Number: 4,717,238

[45] Date of Patent: Jan. 5, 1988

[54] INFRARED OPTICAL FIBER

[75] Inventors: Shiro Sakuragi; Kyoshiro Imagawa, both of Kyoto, Japan

[73] Assignees: Agency of Industrial Science & Technology; Ministry of International Trade & Industry, both of Tokyo, Japan

[21] Appl. No.: 225,744

[22] Filed: Jan. 16, 1981

[30] Foreign Application Priority Data

Jan. 22, 1980 [JP] Japan ................................. 55-5316

[51] Int. Cl.$^4$ .............................................. G02B 6/00
[52] U.S. Cl. .................................................... 350/96.34
[58] Field of Search ............... 350/96.30, 96.31, 96.34, 350/96.29, 1.1

[56] References Cited

U.S. PATENT DOCUMENTS

| | | | |
|---|---|---|---|
| 4,171,400 | 10/1979 | Rosette et al. | 350/1.1 X |
| 4,188,089 | 2/1980 | Gliemeroth et al. | 350/96.34 |
| 4,189,208 | 2/1980 | Grodkiewicz et al. | 350/96.34 |
| 4,253,731 | 3/1981 | Anderson et al. | 350/96.34 |
| 4,315,667 | 2/1982 | Nakagome et al. | 350/96.34 |

FOREIGN PATENT DOCUMENTS

| | | | |
|---|---|---|---|
| 2821642 | 11/1978 | Fed. Rep. of Germany | 350/96.30 |
| 0149652 | 11/1979 | Japan | 350/96.30 |
| 0146402 | 11/1980 | Japan | 350/96.34 |

OTHER PUBLICATIONS

Artyushenko et al., "Thallium Halide Fiber Waveguides for Middle IR Range," *Sov. J. Quantum Elect.*, vol. 11, No. 2, Feb. 1981, pp. 239-240.

Krus et al., "Crystal Materials for Infrared Fibers," *Proc. of SPIE* 266. *Infrared Fibers (0.8-12 μm)*, Feb. 1981, pp. 72-77.

*Japanese Journal of Applied Physics*, vol. 19, No. 10, Oct. 1980, pp. L649-651, Okamura et al., "CsI Crystalline Fiber . . . ".

*Laser Focus*, vol. 12, No. 12, Dec. 1976, pp. 47-50, Lussier, "Guide to IR-Transmissive Materials".

*Optics Letters*, vol. 5, No. 3, Mar. 1980, pp. 85-86, Bridges et al., "Single-Crystal AgBr Infrared Optical Fibers".

1960 Yearly Report-Contract AF 33(616)-6247, pp. 1-10, Kapany et al., "Infrared Fiber Optics".

*Primary Examiner*—William L. Sikes
*Assistant Examiner*—Frank González
*Attorney, Agent, or Firm*—Oblon, Fisher, Spivak, McClelland & Maier

[57] ABSTRACT

An infrared optical fiber comprises a core preponderantly made of a halogenide and a trace quantity of a dopant formed of a halogenide and retains its infrared transmission property stably for a long time.

4 Claims, 3 Drawing Figures

INFRARED OPTICAL FIBER

BACKGROUND OF THE INVENTION

This invention relates to an infrared optical fiber capable of retaining its infrared transmission property stably for a long time.

Infrared optical fibers which use core materials of halogenides such as TlBr, TlCl, AgBr, AgCl, CsI and CsBr are capable of transmitting infrared lights of longer wavelengths than optical fibers using materials such as of quartz glass and, therefore, are advantageously used as transmission means such as for $CO_2$ lasers and CO lasers in long wavelength regions. They nevertheless have a disadvantage that their infrared transmission property tend to degrade rapidly.

The halogenides mentioned above have such narrow zones of elasticity that the optical fibers made thereof, upon exposure to a very slight bending strength, will readily undergo plastic deformation. The plastic deformation coarsens the core-clad interface of the optical fibers and thereby the rugged interface induces scattering loss of infrared rays and degradation of transmissivity.

The aforementioned infrared optical fibers are manufactured by the extrusion method or the pulling method and, consequently, the produced cores assume a polycrystalline structure. With lapse of time, therefore, the cores allow growth of microcrystals and undergo gradual internal change in structure. At the same time, the core-clad interface is gradually disturbed so much as to induce a decline in the transmissivity of the optical fibers.

SUMMARY OF THE INVENTION

One object of this invention is to provide an infrared optical fiber which is capable of retaining its infrared transmission property stably for a long time.

To accomplish the object described above according to the present invention, there is provided an infrared optical fiber whose core is made of one halogenide such as TlBr, TlCl, AgBr, AgCl, CsI and CsBr doped with a minute amount of a dopant composed of a halogenide.

Since the dopant incorporated in the infrared optical fiber of the present invention curbs the otherwise possible mutual slippage of the microcrystals, the optical fiber enjoys an increase in the mechanical strength of the core, an enlargement in the zone of elasticity and a decrease in the interfacial coarsening due to plastic deformation. Moreover, the presence of the dopant impedes the growth of microcrystals and permits long retention of the inner structure of the core assumed during the manufacture of the optical fiber and, accordingly, enables the core to retain its infrared transmission property stably for a long time. The other objects and characteristics of the present invention will become apparent from the further disclosure to be made hereinafter with reference to the accompanying drawing.

Figure 1:
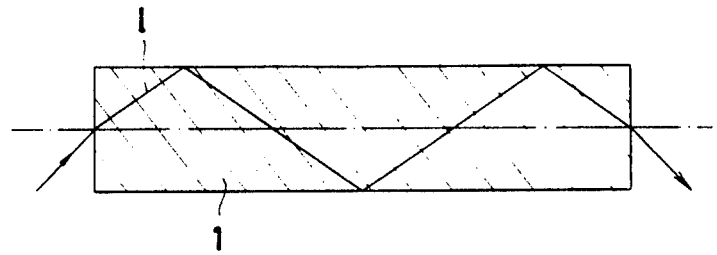
FIG. 1 is an explanatory diagram of an infrared optical fiber of the unclad type to which the present invention is applicable.

DESCRIPTION OF PREFERRED EMBODIMENT:

FIG. 1 illustrates an infrared optical fiber of the unclad type (in this case air is a clad). An infrared light 1 which has entered the core 1 through one end thereof is transmitted to the other end of the core 1 while being subjected to recurrent total reflection on the surface of the core 1 (namely, the interface between the core 1 and the ambient air).

Figure 2:
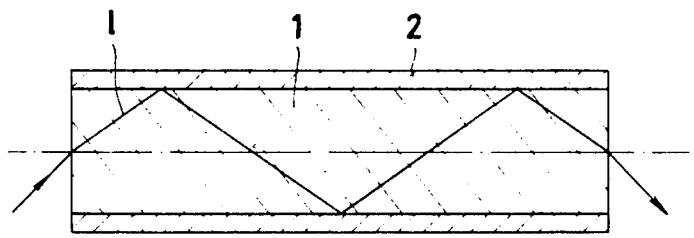
FIG. 2 is an explanatory diagram of an infrared optical fiber of the step index structure type comprising a core and a clad to which the present invention is applicable.

FIG. 2 illustrates an infrared optical fiber of the step index structure type composed of a core 1 having a high index of refraction and a clad 2 having a low index of refraction. An infrared light 1 which has entered the core 1 through one end thereof is transmitted to the other end of the core 1 while being subjected to recurrent total reflection on the interface between the core 1 and the clad 2.

The core 1 in the infrared optical fiber of the construction described above to be provided by the present invention is produced by selecting, as the main component, one metal halogenide such as TlBr, TlCl, AgBr, AgCl, CsI and CsBr, adding to the main component, as a dopant, an amount within the range of from $10^{-1}$ to $10^{-4}$ by molar ratio based on the amount of the main component, of a halogenide composed of one of the alkali metals comprising Li, Na, K, Rb and Cs or one of the alkaline earth metals comprising Ca, Sr and Ba, and one of the halogen elements comprising F, Cl, Br and I, thermally fusing the resultant mixture and molding the molten mixture in the shape of a fine rod of a prescribed diameter as by the extrusion method or the pulling method known to the art. A halogenide consisting of Tl and one of the aforementioned halogen elements may be used as a dopant.

When the proportion of the dopant to be incorporated is not less than $10^{-1}$, the uniformity with which the incorporated dopant is distributed within the core material is impaired to the extent of rendering the manufacture of a fiber of homogeneous quality difficult.

When the proportion is not more than $10^{-4}$, however, the desired effect of the incorporated dopant in improving the mechanical properties of the core is not sufficiently obtained.

The halogenide as the main component of the core and the halogenide as the dopant ought to be those which share the same cation or anion present in the core material. For example, where TlBr is used as the materials for the core 1, any one member selected for the group consisting of TlCl, TlI, LiBr, $CaBr_2$, $SrBr_2$, $BaBr_2$, NaBr, KBr, RbBr and CsBr can be used as the dopant.

An infrared optical fiber in the form of an unclad core as illustrated in FIG. 1 may be produced by selecting TlBr as the main material for the core, adding to the main material a trace quantity of TlCl as the dopant, thermally fusing the resultant mixture and molding the molten mixture in the shape of a fine rod of a prescribed diameter as by the extrusion method or the pulling method known to the art.

An infrared optical fiber of the step index structure type as illustrated in FIG. 2 may be produced by selecting TlBr as the main material for the core, adding to the main material a trace quantity of TlCl, TlI, etc. as the dopant, preparing a rod of the resultant mixture by the same procedure as described above, selecting TlCl as the cladding material, molding this halogenide in the shape of a pipe having a large enough inside diameter to permit insertion therein of the aforementioned rod, inserting the rod into the pipe and molding the resultant rod-pipe composite in the shape of a clad core of a prescribed diameter as by the extrusion method or the pulling method known to the art. Consequently, there is obtained a step index structure type infrared optical fiber.

The infrared optical fiber according to the present invention uses, as the dopant, a halogenide which shares the same cation or anion present in the main material of the core as described above. Since the regularity of crystals in the core material is upset by the incorporation of this dopant, slippage among the microcrystal grains of the core material and growth of microcrystals in the core are curbed, the elastic limit is greatly improved and, at the same time, the infrared transmission property of the fiber is retained stably for a long time.

Now, the present invention will be described specifically with reference to an example.

EXAMPLE:

TlBr was adopted as the main material for the core and TlCl, as the dopant, was added to the main material in an amount of $10^{-2}$ mol based on the amount of the main material. The resultant mixture was fused at a temperature of about 460° C., and the molten mixture was extruded in the shape of a rod 500 μm in diameter and 3 m in length by the extrusion method. Thus was obtained an unclad infrared optical fiber.

Figure 3:
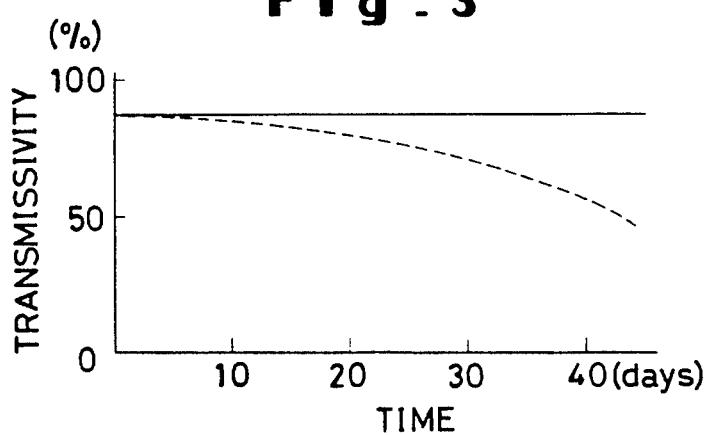
FIG. 3 is a graph showing the infrared transmission property of the optical fiber of the present invention.

The optical fiber was tested for transmissivity. The results were as shown in FIG. 3. In the graph, the solid line represents the transmissivity obtained of the infrared optical fiber incorporating the dopant in accordance with the present invention. In comparison, the dotted line in the graph represents the transmissivity obtained of an infrared optical fiber which was produced under entirely the same conditions as described above except that the incorporation of the dopant was omitted.

It is clear from the graph that since the infrared optical fiber incorporating the dopant acquired improved elastic limit, all the deformations which were caused in the optical fiber by the forces applied thereto for the purpose of bending or deforming the fiber during the polishing the fiber end face and for the purpose of performing various operations on the fiber during the measurement of the transmissivity fell within the range of elastic deformation and, as a result, the surface and interior conditions of the fiber were not appreciably degraded and the light transmissivity of the fiber were retained stably for a long time.

In contrast, the optical fiber prepared for the purpose of comparison without incorporation of the dopant readily yielded to plastic deformation under the forces applied thereto for the purpose of bending or deformation and, as a result, signs of optical degradation appeared on the surface and or the interior of the fiber and the transmissivity of the fiber was impaired within a short period of time.

What is claimed is:

1. An infrared optical fiber having a core of a material preponderantly comprising a halogenide selected from the group consisting of TlBr, TlCl, AgBr, AgCl, CsI and CsBr, said core incorporating a trace quantity of a dopant comprising a halogenide consisting of a cation selected from the group consisting of Li, Na, K, Rb, Cs, Ca, Sr, Ba and Tl and an anion selected from the group consisting of F, Cl, Br and I, the proportion of said trace quantity of a dopant to said core material falling within the range of from $10^{-1}$ to $10^{-4}$ mol based on the amount of said core material.

2. The infrared optical fiber according to claim 1, wherein said halogenide shares the same cation or anion present in the core material.

3. A fine polycrystalline infrared light transmitting optical fiber having a core prepared by hot extrusion of an alkali metal halide, silver halide, or thallium halide crystal, said core having incorporated therein a trace quantity of a dopant comprising a fluoride, chloride, bromide, or iodide of calcium, strontium, or barium.

4. A fine, polycrystalline, infrared light transmitting optical fiber having a core prepared by hot extrusion of the halogenide selected from the group consisting of cesium halide, silver halide, or thallium halide crystal, said core having incorporated therein a trace quantity of a dopant comprising a fluoride, chloride, bromide, or iodide of calcium, strontium, or barium.

* * * * *